United States Patent [19]

Ulrich et al.

[11] Patent Number: 5,291,497
[45] Date of Patent: Mar. 1, 1994

[54] METHOD FOR TESTING, DEBUGGING, AND COMPARING COMPUTER PROGRAMS USING CONCURRENT SIMULATION OF PROGRAM PATHS

[75] Inventors: Ernst G. Ulrich, Bedford; Karen P. Lentz, N. Andover; Michael M. Gustin, Wilmington, all of Mass.

[73] Assignee: Digital Equipment Corporation, Maynard, Mass.

[21] Appl. No.: 6,187

[22] Filed: Jan. 19, 1993

Related U.S. Application Data

[63] Continuation of Ser. No. 649,399, Feb. 1, 1991, abandoned.

[51] Int. Cl.$^5$ ............................................. G06F 11/00
[52] U.S. Cl. .................................... 371/19; 364/267.10
[58] Field of Search ................. 371/19, 22.4, 23, 22.3, 371/25.1, 15.1, 67.1; 364/267.10

[56] References Cited

U.S. PATENT DOCUMENTS

| | | | |
|---|---|---|---|
| T939,010 | 10/1975 | Bender | 371/19 |
| 4,687,988 | 8/1987 | Eichelberger et al. | 371/22.3 |
| 4,729,096 | 3/1988 | Larson | 364/300 |
| 4,745,355 | 5/1988 | Eichelberger et al. | 371/22.3 |
| 4,769,817 | 9/1988 | Krohn et al. | 371/23 |
| 4,993,027 | 2/1991 | McGraw et al. | 371/22.4 |
| 5,095,483 | 3/1992 | Dubler et al. | 371/23 |

FOREIGN PATENT DOCUMENTS

1413938 11/1975 European Pat. Off. .
0179334  4/1986 European Pat. Off. .

OTHER PUBLICATIONS

K. C. Knowlton, A Combination Hardware-Software debugging System, Jan. 1968, pp. 84-86.

Primary Examiner—Robert W. Beausoliel, Jr.
Assistant Examiner—Phung My Chung
Attorney, Agent, or Firm—Kenneth F. Kozik; A. Sidney Johnston; Albert P. Cefalo

[57] ABSTRACT

A simulation method allowing an experimenter to test and debug computer programs concurrently. The method ultilizes the generation of signatures to observe interactions of various subprogram paths with a reference case.

4 Claims, 4 Drawing Sheets

C = CE, a Concurrent or C-experiment
CS = Concurrent Simulation
CSPP = Comparative Simulation of Program Paths
C - effect = An effect due to a C-experiment (also C-item)
C - origin = An origin or cause of a CE
C - program = A program executed by a CE
Captive C = A C not "escaping" from the network
C - R distance = A C-to-R similarity measure
C - C distance = A C-to-C similarity measure
Distance = Statistical difference between two experiments
Fair C = A C not executing a C-Program
Fair Race = A race involving only fair Cs
Explicit Simulation = Work done for an individual C
Implicit Simulation = Work done by the R for all Cs
Latent C = A C not producing any C-effects
MAR = Memory Address Register
Meta-program = An artificial "observation" program
PC = Program Counter
Primary Observers = Normal user defined observation points
Race = The R and Cs running side-by-side
R = RE, the Reference Experiment
R - program = The program executed by R
Secondary Observers = Auxiliary observation points
Signature = Statistical information about an experiment
Strong CE = A CE that executes a CE - program
Strong Race = RE and CE programs running side-by-side
Tie = The RE and the CEs produce the same result

FIG. 2

METHOD FOR TESTING, DEBUGGING, AND COMPARING COMPUTER PROGRAMS USING CONCURRENT SIMULATION OF PROGRAM PATHS

This application is a continuation of application Ser. No. 07/649,399, filed Feb. 1, 1991, now abandoned.

RELATED APPLICATIONS

The present invention is related to the following application filed at the same time as this application:

U.S. patent application Ser. No. 07/649,402, by Ernst Guenther Ulrich and Karen Panetta Lentz, entitled METHOD FOR MULTI-DIMENSIONAL CONCURRENT SIMULATION USING A DIGITAL COMPUTER.

FIELD OF THE INVENTION

This present invention is related to simulating experiments on a digital computer, and in particular, to an improved method of running side-by-side simulation of related experiments within one computer run.

BACKGROUND OF THE INVENTION

Based on the power of the computer and on the ability to build adequate models of reality, the simulation of experiments has become an increasingly effective and often superior substitute for physical experimentation. For example, the building and testing of engineering prototypes is an experimentation effort that is done more and more in terms of models and simulations rather than conventionally.

Concurrent Simulation (CS) is the simultaneous, side-by-side simulation of related experiments within one computer run. CS is a method that runs on conventional computers, performing concurrent experiments without concurrent hardware. It applies and is limited to systems simulated with discrete events. Typically 10 to 1,000 times faster than serial (one-at-a-time) simulation of single experiments, its speed is largely based on the number and similarities between experiments. CS dates from 1970/1973 and was first developed for fault simulation of gate-level digital networks. Over the years it has increased in generality and, more recently, evolved into a simulation methodology. Whenever discrete event simulation is the method chosen to solve a particular problem, CS is usually better than serial simulation. CS has several advantages over serial simulation.

First, all experiments advance synchronously through the dimension of time, and CS is therefore analogous to a race in which the experiments are competitors. This constitutes a race methodology and a comparative style of simulation. This methodology and the speed of CS permit the solution of problems more difficult and larger than with serial simulation. A simulation strategy based on this methodology and comparative style is to simulate and observe related experiments which are initially the same but later become different.

Second, observation, which is awkward and costly for serial simulation, is handled easily and elegantly with CS. The experiments are observed comparatively, and can be compared in exact detail as well statistically. Statistical "signatures" are maintained and periodically analyzed for all experiments.

Next, CS offers speed in various forms. Relative to serial simulation, experiments are compressed into a single run. The idle time between serial simulations is avoided and a simulation project is strategically accelerated. Also, due to the number of concurrent experiments, due to their similarity, and the similarity between them and a reference experiment, the CPU time, as mentioned previously, is typically 10 to 1,000 times less than the equivalent serial simulations. And, based on the analysis of signatures, the initial reference experiment may often be replaced with a more central one. This reduces the average differences between reference and concurrent experiments and gains additional speed.

Lastly, CS provides accuracy and generality. In fields such as biology and chemistry it is desirable to perform related and similar physical experiments in parallel, but it is normally too costly due to labor, space, equipment, and the raw materials that are needed. CS is a parallel (and precisely time-synchronous) form of experimentation, and is therefore an alternative to parallel physical experimentation. It requires no resources except a conventional computer and modeling/simulation skills.

SERIAL AND CONCURRENT SIMULATION

The following figure shows (a) serial simulation and (b) the equivalent Concurrent Simulation.

```
S0      S1      S2      Sn   TIME   C0 = R
 .->    |.->   |.->    |     1     |
 :      |:     |:      |     2     |        C2
 :      |:     |d      |     3     |------>d
 :      |:     |d  :   |     4     |   C1   d
 :      |d  :  |d      |     5     |->d     d
 :      |d  :  |d  :   |     6     |   d    d
 :      |d  :  |d      |     7     |   d    d
 :      |d  :  |d  :   |     8     |<-d     d
 :      |:     |d      |     9     |<-----  d
 :      |:     |:      |    10     |        Cn
 :      |:     |:    d |    11     |------->d
 :      |:     |:    d |    12     |<------ d
 :      |:     |:      |    13     |
|_/     |_/    |_/     |    14     |
   (a) Serial Simulation                (b) Concurrent Simulation
```

Experiments C0 to Cn are equivalent to the serial simulations S0 to Sn. C0=R is the fully simulated reference experiment, while C1 to Cn are small scale concurrent C-experiments. For example, C2 diverges from R at time t3, exists as long as it differs from (d) from R, and converges with R at time t9. Most of the simulation work is done by the R-experiment. It handles, at no cost per C-experiment, all segments of all C-experiments identical to their counterparts in R. The R-experiment carries information, i.e., the identity numbers of C-experiments not performing the R-experiment. The simulation cost per C-experiment is proportional to its difference from R. If a C-experiment remains identical to R, then it is simulated at no cost. If it is almost identical to R, then it is simulated at almost no cost. Many data distinct C-experiments are handled at almost no cost by the R-experiment or as rather inexpensive fraternal C-experiments.

TESTING AND DEBUGGING COMPUTER PROGRAMS

Adequate testing and debugging of computer software is imperative for ensuring quality, yet with existing methods, the testing process is tedious and does not exercise the computer software thoroughly. This lack of thoroughness, the amount of manual labor, and the total time spent for testing and debugging a typical piece of software are shortcomings addressed here.

SUMMARY OF THE INVENTION

It is the object of the present invention to provide a simulation technique for the testing and debugging of computer programs. This method differs from conventional methods in that a target program is not executed but that the program's execution is simulated, and that many program path experiments are simulated simultaneously. The method here is labeled CSPP, the Concurrent Simulation of Program Paths. The technique and vehicle for CSPP is MDCS, Multi-Domain Concurrent Simulation. Critical input variables for a computer program are defined, and a set of input values for each of these variables is assigned. A reference value is selected and assigned a signature. Further signatures are created when input variables interact with the reference value and finally compared to correctly running cases.

Other objects, features and advantages of the invention will become apparent on a reading of the specification when taken in conjunction with the drawings in which like reference numerals refer to like elements in the several views. The objects and advantages of the invention may be realized and obtained by means of instrumentalities and combinations particularly pointed out in the appended claims. The improvements of the present invention over the prior art and the advantages resulting therefrom will become more apparent upon reading the following description of the preferred embodiment taken in conjunction with the drawings.

BRIEF DESCRIPTION OF THE DRAWINGS

The improvements of the present invention over the prior art and the advantages resulting therefrom will become more apparent upon reading the following description of the preferred embodiment in which:

FIG. 2 is a table listing of terminology abreviations used thoughout this description of CSPP;

DESCRIPTION OF THE PREFERRED EMBODIMENTS

Figures 1A, 1B:
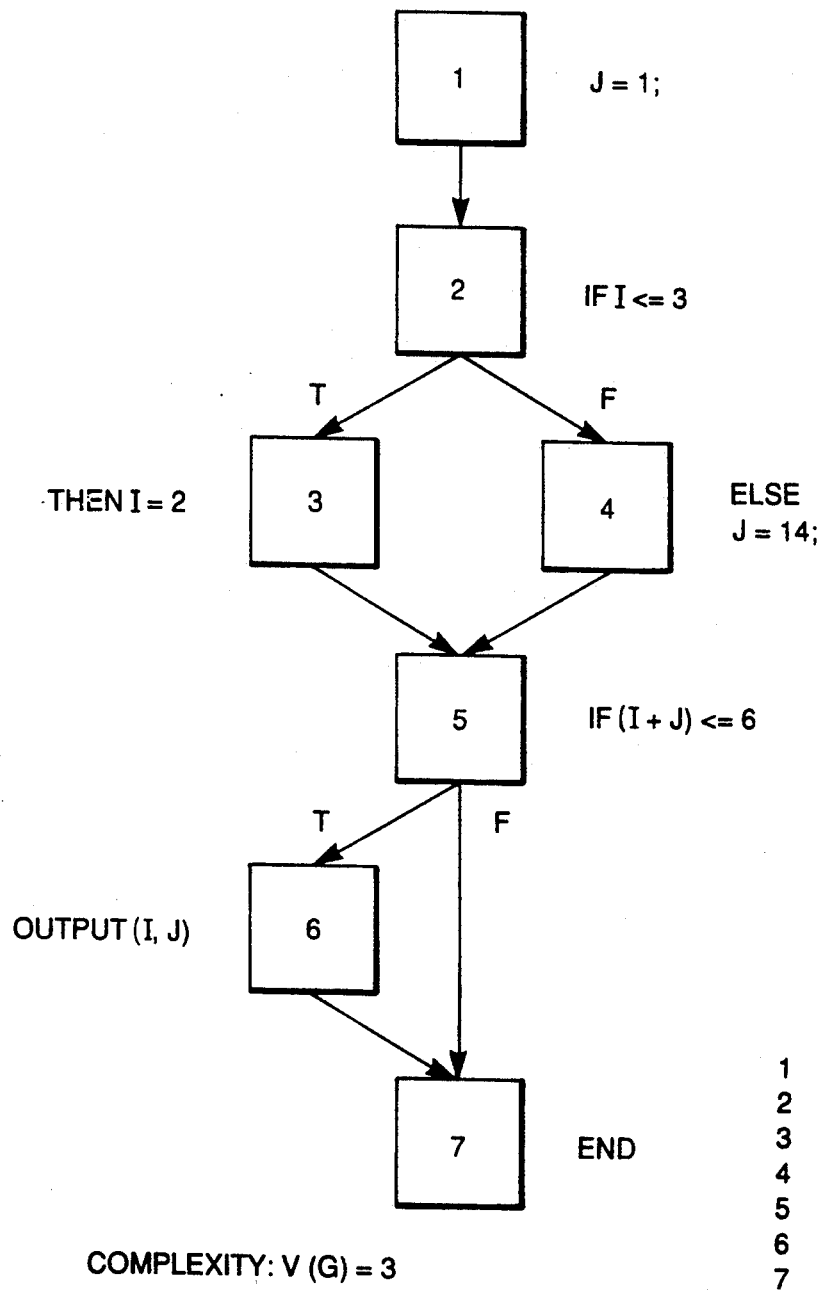
FIGS. 1a and 1b are representations of a small computer program.

CSPP can simplify and reduce design verification and diagnostic fault simulation. For design verification, its CPU-time advantage over convential methods is estimated to exceed 40:1. For large systems the method of Clock Suppression may boost this beyond 200:1. For diagnostic fault simulation, the CPU-time advantage ranges from 100 to 10,000:1 over conventional methods.

CSPP is a method that utilizes MDCS to:
- Find and eliminate more bugs and find and eliminate them faster than conventionally, so that the programs tested/debugged will contain fewer residual bugs.
- Allow many test cases to be simulated in a single simulation.
- Automate portions of the testing procedure such that only viable input conditions are simulated. This eliminates the manual labor of chosing viable input conditions.
- Provide observation and automated statistics gathering of the execution of the program, such as data differences, instruction differences, and erratic behavior (infinite loops). Observation includes precise coverage (exercised versus unexercised) information, as well as a precise instruction count per program path.
- Provide the ability to simulate alternative programs against each other, comparing their speeds, accuracies, and complexities.

CSPP simulates the execution of a computer program in terms of instructions or high level constructs. Its central features are that many program path "experiments" are simulated simultaneously, and that unique signatures are generated for unique program paths. Each experiment is due to input conditions specified by the user. One chronic problem with conventional tools, the specification of nonviable input conditions and thus running of nonviable programs, is essentially avoided here because the worst types of nonviable programs are automatically not executed with CSPP. Overall, CSPP is easier to use, more thorough, informative, and efficient than convential testing and debugging tools.

For program testing, the user needs to verify the correctness of (output) results of the experiments, while for program debugging he would analyze signatures. Each signature, which includes a statistical "distance" between an experiment and an artificial "average" experiment, is information that cannot be created with conventional testing/debugging.

CSPP is based on Multi-Domain Concurrent Simulation (MDCS), which is a generalization of Concurrent Simulation (CS). MDCS permits different experiments to interact. That is, primary or P-experiments due to input variables may interact with other P-experiments to produce interaction or I-experiments. Also, MDCS automatically generates efficiency via "standin" experiments. P-experiments act in one-for-many fashion at experiment sources, where many locally identical P-experiments act in a one-for-many fashion at experiment sources.

CSPP can be explained in terms of a similar but expensive alternative method. This method consists of defining input variables of a program, defining a small set of values per variable, and executing the program for all orthogonal combinations of these values. For example, a program may have six orthogonal input variables and three values per variable may be defined. This constitutes a program test of 729 program versions, i.e. $3^6$ input combinations. Essentially, this method is impractical because a large number of non-viable program versions would be executed. CSPP achieves the intent of this method, but avoids its disadvantages.

For the above program a CSPP simulation involving six orthogonal domains is appropriate. Three values per variable are defined by the user, including one reference value. The simulation begins with the execution of the reference program or R-program. This R-program then "encounters" input variables, and as a result P-programs arise which are different from the R-program. These, in turn, encouter additional input variables, and interaction or I-experiments due to these encounters are created. For example, if a program contains a bug near its entry point, its execution may encounter no input variables and only one incorrect program version or path may be established. A more likely example is that input variables are encountered and that per encounter appoximately half of the specified values will generate distinct I-experiments. Thus, while a program has many potentially distinct program paths and output results, it is likely that only a fraction of them will occur. The definition of different values is not restricted to input variables, but for debugging it is often useful to "force" a few different (from the R-experiment) values for internal variables.

If structured techniques are used to test and debug computers programs, the following process steps would occur:
  designing the program
  calculating the complexity of all modules that make up the program
  deriving the test basis paths for a module
  deriving the data for the test paths Measuring complexity quantifies the testability attributes of modules and also quantifies the number of independent test paths through a module. Knowing the complexity of a module, the user can reduce the number of paths that need to be tested. FIG. 1a illustrates an example of deriving test paths for a program. The boxes containing numbers in FIG. 1a refer to the corresponding individual lines of pseudo-code in FIG. 1b. More specificly, box 1 in FIG. 1a corresponds to line 1 in FIG. 1b, box 2 in FIG. 1a corresponds to line 2 in FIG. 1b, box 3 in FIG. 1a corresponds to line 3 in FIG. 1b, box 4 in FIG. 1a corresponds to line 4 in FIG. 1b, box 5 in FIG. 1a corresponds to line 5 in FIG. 1b, box 6 in FIG. 1a corresponds to line 6 in FIG. 1b, and box 7 in FIG. 1a corresponds to line 7 in FIG. 1b. If the test paths were derived for the code in FIG. 1b, by enumerating all possible paths from the constructs, then they'd be the following:

1-2-3-5-6-7
1-2-3-5-7
1-2-4-5-6-7
1-2-4-5-7

Note, that because of the actual instructions in the code, the only viable paths are:

1-2-3-5-6-7
1-2-4-5-7

The intention of this example is to demonstrate that testing programs requires a lot of manual work. The test paths derived must be accurate, but notice that the user is subjected to manually distinguishing viable paths while attempting to keep the number of test cases at a minimum due to central processing unit (CPU) time on a computer. As the size and the complexity of a program increases, the time of deriving test paths increases. This results in a greater number of test cases to be set up and executed.

The work described here uses a substantial amount of terminology that is summarized in the table in FIG. 2.

Figure 3:
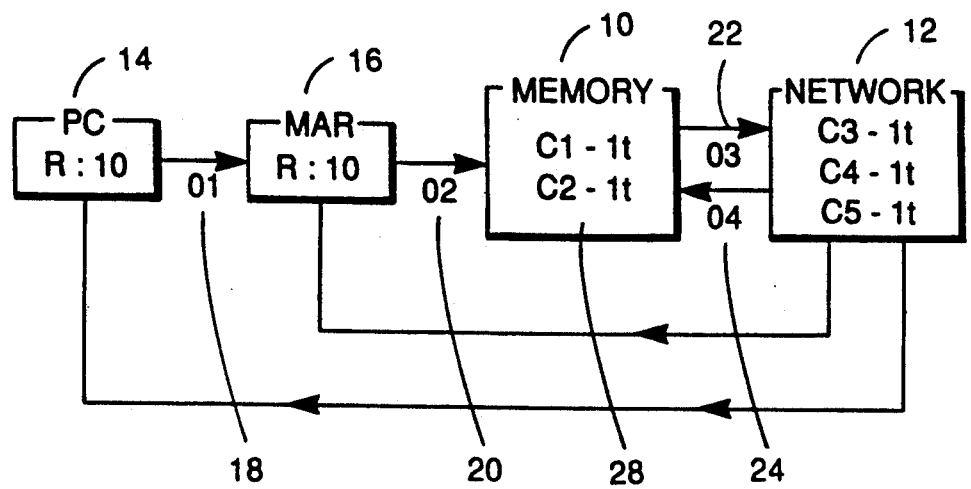
FIG. 3 is a conceptual representation of the main parts of a computer.

FIG. 3 is a conceptual representation of the main parts of a computer containing and executing a program. The PC 14 is the program counter. The MAR 16 is the memory address registers. FIG. 3 further shows the connections between a Memory 10 (holding programs and data) and a Network 12 that executes the program instructions. The Network 12 is the central processing unit (CPU) performing the work. In reality, the PC 14 and MAR 16 can contain only one value, pointing to one location in the Memory 10. A program counter (PC) 14 and a memory address register (MAR) 16 are important nodes involved in the program flow, and 01 18 and 02 20 are therefore important observation points to be used during a typical simulation. Similarly, the data connections between memory 10 and network 12 (observation points 03 22 and 04 24) are important. The basic program being observed is the reference program (R-program). Executed by the reference experiment (R-experiment), it executes reference instructions (R-instructions). FIG. 3 also shows Cs (concurrent experiments), normally injected into a memory 10 as experiment origins or into a network 12 as fault origins. Initially, these latent Cs (labeled C1-lt, C2-lt, etc. in memory 10) are small differences relative to the reference experiment.

Figure 4:
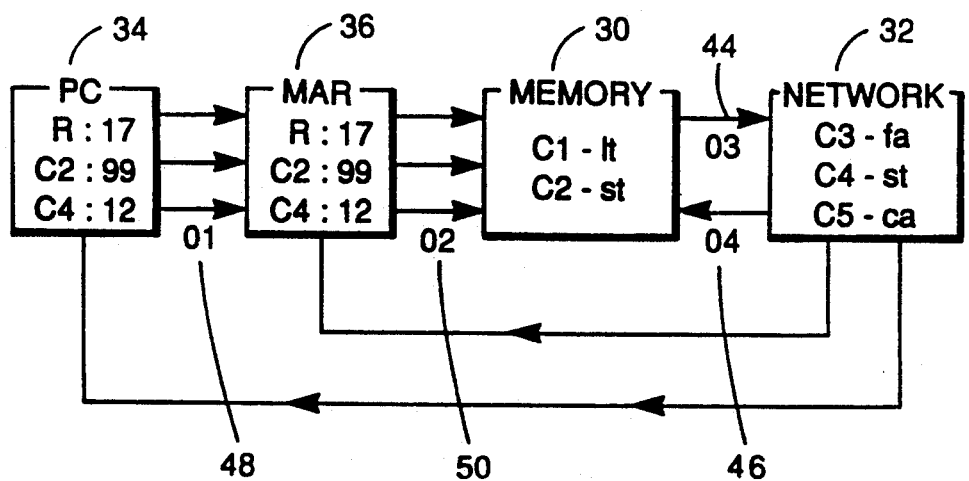
FIG. 4 is a conceptual representation simulation utilizing CSPP.

FIG. 4 is similar to FIG. 3 except that it indicates what is contained in the simulated PC 34 and MAR 36. During (concurrent) simulation the PC 34 and MAR 36 may contain many values, pointing to different locations (for different experiments) in a Memory 30. More specifically, FIG. 4 shows that as the R-program exercises the latent Cs they emit C-effects and grow into "captive","fair", and "strong" Cs, labeled C5-ca, C3-fa, and C4-st respectively, in network 32. These attributes describe the observability of Cs, and are useful as part of a C-signature. A C-experiment becomes increasingly observable as it produces C-effects. It could be captively observable in the network 32 (at observation points in the network), fairly observable as C-effects cross data paths 03 44 or 04 46, or strongly observable as C-effects cross the 01 48 or 02 50 control paths. In FIG. 4 the PC 34 and MAR 36 contain C-effects due to strong Cs C2-st and C4-st, and C-programs C2 and C4 are running concurrently with the R-program. Strong Cs always execute C-instructions and C-programs.

The R-program is executed by the R-experiment and all latent, captive, and fair Cs. These Cs are generally unobservable at points 01 48 through 04 46, but fair (data-only) Cs may become briefly observable. For example, as the R-program moves across 04 46 in FIG. 4, unobservable (implicit) data will move along for latent and captive Cs, but an observable (explicit) data item for fair C C3-fa may also move along. This C-effect carries the ID number C3, and, without affecting the PC 34 or MAR 36, experiment C# becomes briefly observable at 04 46. This also means C3 becomes observable within the memory 30, i.e. a C-effect will be stored in a memory location.

Figure 5:
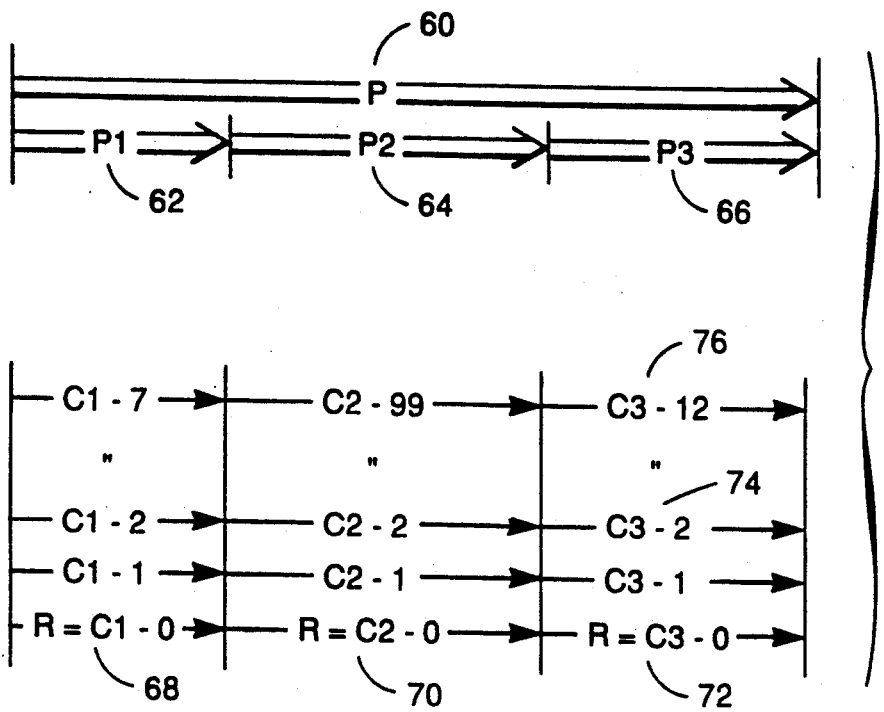
FIG. 5 is a conceptual representation of three computer subprograms arranged to execute sequentially.

A basic design verification strategy assumed here is the execution and observation of a concatenated program consisting of small subprograms. Referring to FIG. 5, a concatenated program P 60 running perfectly from beginning to end provides a strong probability of the absence of design erros, a probability that increases with the number of subprograms. For each subprogram a number of related cases are executed side-by-side. In FIG. 5 subprograms P1 62, P2 64, and P3 66 contain 8, 100, and 13 cases arranged to be executed sequentially. The R executes cases C1-0 68, C2-0 70, and C3-0 72. All other cases are handled with Cs. Each subprogram is analogous to a race, and each case is a racer. A race is fair or strong. In a fair race only one program, i.e. the R-program is executed. It may consist of many related cases, but they differ from each other only in terms of data rather than control. During a strong race C-programs are running against the R-program. C-programs arise at the beginning of the race, or later due to a strong one. A race is normally over when the R reaches the end of the subprogram. At that time the differences or similarities between cases have usually been observed. Generally, the C-experiments involved in this race will then be removed. Then the R will execute a next instruction, initiating a next race.

Observation of races can be optimized by arranging tie races, i.e., causing the final results of a race to be identical for correctly running cases. This can be done for fair and strong races, and in a direct or indirect fashion. For example, arranging the tie race $99+1=98+2=97+3=100$ is quite direct. However, if the additions $1+1=2$ and $100+100$ must be verified, this requires some indirectness to create a tie. It can be done with the help of extra additions, i.e. $1+1+200=100+100+2=202$. Totally unrelated cases can be forced into a tie. For example, if the predicted results of two cases are the number 7777 and the symbol ABC, a tie may be arranged with a few instructions per case: the actual individual results are compared against a prestored counterpart; if they agree, a common pseudo result is stored in the same place for both cases, thus producing a tie. Design verification experiments that can be done with the above mechanism are the following:

1. Arithmetic operations with different sets of data, e.g., $A+B=C$, $E+F=G$, etc.
2. Information transfers such as from a single memory word M1 to many registers, and subsequently to memory word M2. This is another tie race, where all correct results will be naturally identical.
3. Execute related instructions opposite to each other. For example, if cases C3-0 72 to C3-2 74 in FIG. 5 contain an ADD instruction as its major item to be verified, this could be replaced by a SUBTRACT for cases C3-3 to C3-12 76.
4. Execute related or unrelated instructions side-by-side. This is direct application of the race philosophy and is a strong race. It permits side-by-side comparison of correctness and timing for an arbitrary number of instructions.
5. Arrange two or more cases so that the two or more branches of a decision instruction will be executed concurrently. With proper observation, this exposes the point of departure and precise timing.

Figure 6:
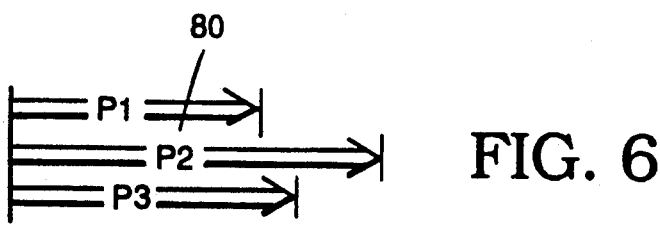
FIG. 6 is a conceptual representation of three computer subprograms arranged to execute concurrently.

In FIG. 5 the subprograms P1 62, P2 64, and P3 66 are simulated sequentially. Often it will be possible to rearrange this and simulate these programs concurrently, producing a much "shorter but wider" simulation as seen in FIG. 5. This is efficient because it reduces the clock cycles simulated. Clocks often represent the largest share (often 90% for a large network) of simulation activity, and thus consume a proportional share of simulation CPU-time. Reducing the clock cycles from C to C/20 will not reduce the CPU-time to 1/20, but may come close to it. This re-arrangement demands pseudo ties, arranging it so that all correct cases have the same result. Cases are dropped from the simulation when this result is achieved. It should be noted that observation is affected here. Subprogram P2 64 in FIG. 5 may be a fair race, where only the R-program is executed. The same subprogram P2 80 in FIG. 6 becomes a strong race, with all caes executing strong programs distinct form the reference program R=C1-0 68 in FIG. 5. This method is also useful when a simulation must be repeated with only minor variations to analyze a specific design problem; it facilitates the suppression of all but the critical subprogram and thus will often save CPU-time. FIG. 6 represents the subprograms of FIG. 5 when arranged concurrently, i.e. all 121 experiments will run concurrently.

It should be apreciated that modifications and additions will be apparent to those of ordinary skill in the art in applying the teachings of the invention described herein to various applications. Accordingly, the invention should not be limited by the description herein of a preferred embodiment but, rather, the invention should be construed in accordance with the following claims.

What is claimed is:

1. A method for testing and debugging a plurality of computer programs, the method comprising the steps of:
    a. establishing a set of computer program paths within each one of the plurality of computer programs;
    b. generating a signature from a simulation of each computer program path; and
    c. comparing each signature generated from each computer program path to a corresponding one of a plurality of expected execution results for the computer program path to determine an absence, a presence, and a location of any number of computer program design errors.

2. A method for testing and debugging a computer program utilizing multi-domain concurrent simulation on a digital computer system comprising the steps of:
    a. providing a set of input variables for a computer program having a series of computer program paths;
    b. defining a set of values for each of the input variables;
    c. identifying a reference value as a first value assigned to each input variable;
    d. initiating a first computer program as a simulation run of each computer program path on a computer using the reference value of each of the input variables and assigning each simulation run a corresponding first reference signature;
    e. simulating each of the computer program paths using a succeeding one of the set of values for each one of the set of input variables and providing a first group of primary experiments corresponding to a difference between the reference signature of each computer program path and the succeeding one of the set of values and assigning each one of the primary experiments with unique signatures;
    f. simulating each of the computer program paths using a next succeeding one of the set of values for each one of the set of input variables and providing a second group of primary experiments corresponding to a difference between the reference signature of each computer program path using the next succeeding one of the set of values and assigning each one of the second group of primary experiments with unique signatures;
    g. forming a plurality of difference signatures corresponding to differences in signatures between the signature of a reference experiment and the signature of the first and second groups of primary experiments; and
    h. comparing the difference group of signatures generated from each computer program path to the corresponding reference signature to determine an absence, a presence, and a location of any number of computer program design errors.

3. The method for testing and debugging a plurality of computer programs according to claim 1 wherein the each one of the plurality of computer programs have a plurality of computer language instructions.

4. The method for testing and debugging a plurality of computer programs according to claim 3 wherein step of establishing the set of computer program paths comprises the step of providing all possible paths from constructs of the computer language instructions.

* * * * *